United States Patent
Cai et al.

(10) Patent No.: US 8,401,400 B2
(45) Date of Patent: *Mar. 19, 2013

(54) DETECTION OF DATA IN SIGNALS WITH DATA PATTERN DEPENDENT SIGNAL DISTORTION

(75) Inventors: Yi Cai, Eatontown, NJ (US); Morten Nissov, Ocean, NJ (US); Alexei N. Pilipetskii, Colts Neck, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/718,132

(22) Filed: Mar. 5, 2010

(65) Prior Publication Data

US 2010/0232809 A1    Sep. 16, 2010

Related U.S. Application Data

(60) Provisional application No. 61/158,823, filed on Mar. 10, 2009.

(51) Int. Cl.
    *H04B 10/06*    (2006.01)
(52) U.S. Cl. .................. 398/202; 398/204; 398/208
(58) Field of Classification Search .............. 398/25, 398/33, 202, 204, 208
    See application file for complete search history.

(56) References Cited

U.S. PATENT DOCUMENTS

| | | | |
|---|---|---|---|
| 4,262,360 A | 4/1981 | Bigo et al. | |
| 5,049,830 A | 9/1991 | Yoshida | |
| 6,052,412 A | 4/2000 | Ruether et al. | |
| 6,560,303 B1 | 5/2003 | Fan et al. | |
| 7,031,405 B1 | 4/2006 | Touzni et al. | |
| 7,133,550 B2 * | 11/2006 | Hiroi et al. ................... 382/145 | |
| 7,486,893 B1 | 2/2009 | Pepper et al. | |
| 2004/0197103 A1 | 10/2004 | Roberts et al. | |
| 2004/0208613 A1 | 10/2004 | Sinha et al. | |
| 2005/0147415 A1 | 7/2005 | Fee et al. | |
| 2005/0169412 A1 * | 8/2005 | Yang et al. ............... 375/350 | |
| 2005/0244164 A1 | 11/2005 | Miyashita et al. | |
| 2006/0132789 A1 | 6/2006 | Davidson et al. | |
| 2006/0291550 A1 | 12/2006 | Wang et al. | |
| 2007/0002982 A1 * | 1/2007 | Heikkila .................... 375/346 | |
| 2007/0092260 A1 | 4/2007 | Bontu et al. | |
| 2007/0149135 A1 | 6/2007 | Larsson et al. | |
| 2007/0222654 A1 * | 9/2007 | Vrazel et al. ............... 341/144 | |
| 2007/0300119 A1 | 12/2007 | Hidaka | |
| 2008/0025733 A1 | 1/2008 | Nazarathy et al. | |
| 2008/0240224 A1 | 10/2008 | Carballo et al. | |
| 2008/0267638 A1 | 10/2008 | Nakashima et al. | |
| 2009/0033418 A1 | 2/2009 | Ericson et al. | |
| 2009/0047030 A1 | 2/2009 | Hoshida | |

OTHER PUBLICATIONS

Li, Recent advances in coherent optical communication, Advances in Optics and Photonics 1,279?307 [online], Feb. 11, 2009 [retrieved on Apr. 15, 2010],Retrieved from the Internet<URL:http://ofc.optics. ucf.edu/research/Recent%20advances%20in%20coherent%200 ptical%20communication.pdf.

Liu, Digital self-coherent detection, Optics Express vol. 16, No. 2 [online], Jan. 21, 2008 [retrieved on Apr. 15, 2010], Retrieved from the Internet:<URL: http://www.opticsinfobase.org/view_article, cfm?gotourl=http%3A%2F%2Fwww%2Eopticsinfobase%2Eorg% 2FDirectPDFAccess%2F03E36195%2DBDB9%2D137E%2DC6C 65EC37B7F62E9%5F148802%2Epdf%3Fda%3D1%26id%3D148 802%26seq%3DO&org=.

(Continued)

*Primary Examiner* — Dalzid Singh

(57) ABSTRACT

A detection system and method may be used to detect data transmitted in a signal with data pattern dependent signal distortion. In general, a detection system and method compares samples of a received signal with stored samples of distorted signals associated with known data patterns and selects the known data patterns that correspond most closely with the samples of the received signal. The detection system and method may thus mitigate the effects of data pattern dependent signal distortion.

21 Claims, 7 Drawing Sheets

OTHER PUBLICATIONS

Noe, "PLL-Free Synchronous QPSK Polarization Multiplex/Diversity Receiver Concept With Digital I&Q Baseband Processing," IEEE Photonics Technology Letters, vol. 17, No. 4, pp. 887-889 (Apr. 2005).

Ly-Gagnon et al.., "Coherent Detection of Optical Quadrature Phase-Shift Keying Signals With Carrier Phase Estimation," Journal of Lightwave Technology, vol. 24, No. 1, pp. 12-21 (Jan. 2006).

Cai, et al., "Comparison of Two Carrier Phase Estimation Schemes in Optical Coherent Detection Systems," Optical Fiber Communication and the National Fiber Optic Engineers Conference, 2007, pp. 1-3 (Mar. 2007).

International Search Report and Written Opinion dated Apr. 27, 2010 issued in related International Patent Application No. PCT/US10/26504.

International Search Report and Written Opinion dated May 12, 2010 issued in PCT Patent Application No. PCT/US10/26513, 10 pages.

Cai, On Performance of Coherent Phase-Shift-Keying Modulation in 40 Gb/s Long-Haul Optical Fiber Transmission Systems, Optical Fiber Communication and the National Fiber Optic Engineers Conference, Mar. 2006, 3 pages, paper JThB11.

Ho, Electronic Compensation Technique to Mitigate Nonlinear Phase Noise, Journal of Lightwave Technology, Mar. 2004, pp. 779-783, vol. 22, No. 3.

International Search Report and Written Opinion dated Apr. 28, 2010 issued in PCT Patent Application No. PCT/US10/26508, 11 pages.

International Search Report and Written Opinion dated May 4, 2010 issued in PCT Patent Application No. PCT/US10/26511, 10 pages.

Ip et al., Compensation of Dispersion and Nonlinearity in WDM Transmission using Simplified Digital Backpropagation, IEEE, 2008, pp. 123-124.

Kikuchi, Electronic Post-compensation for Nonlinear Phase Fluctuation in a 1000-km 20-Gbit/s Optical Quadrature Phase-shift Keying Transmission System Using the Digital Coherent Receiver, Optics Express, Jan. 21, 2008, pp. 889-896, vol. 16, No. 2.

Li et al., Electronic post-compensation of WDM transmission impairments using coherent detection and digital signal processing, Optics Express, Jan. 21, 2008, pp. 880-888, vol. 16, No. 2.

\* cited by examiner

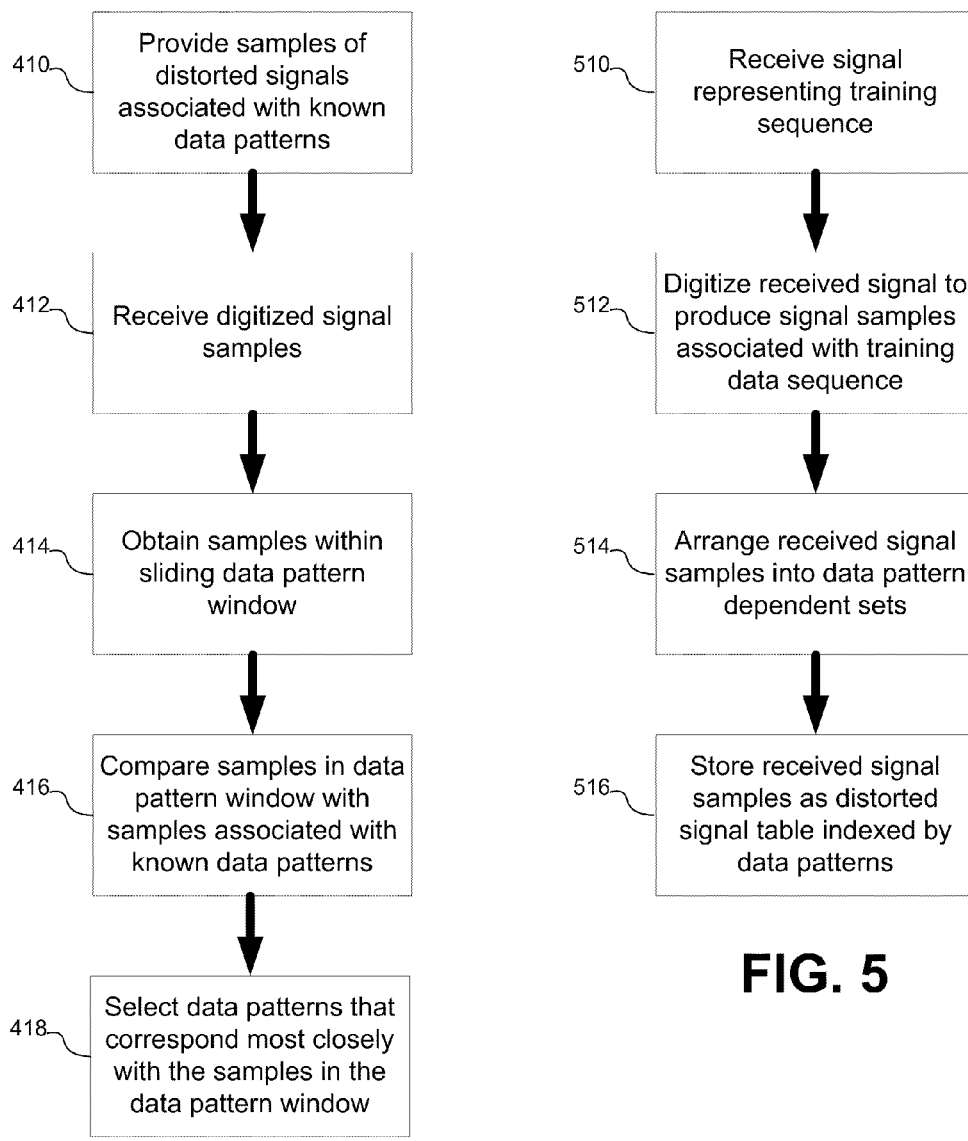

DETECTION OF DATA IN SIGNALS WITH DATA PATTERN DEPENDENT SIGNAL DISTORTION

CROSS-REFERENCE TO RELATED APPLICATIONS

The present application claims the benefit of U.S. Provisional Patent Application Ser. No. 61/158,823, filed on Mar. 10, 2009, which is fully incorporated herein by reference.

TECHNICAL FIELD

The present disclosure relates to data detection and more particularly, to detection of data in signals with data pattern dependent signal distortion.

BACKGROUND INFORMATION

Signals may be used to transmit data over distances. In optical communication systems, for example, data may be modulated on one or more optical wavelengths to produce modulated optical signals that may be transmitted over optical waveguides such as optical fibers. One modulation scheme that may be used in optical communication systems is phase shift keying in which data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of phase shift keying and differential phase shift keying formats, such as return-to-zero DPSK (RZ-DPSK). Another modulation format is quadrature amplitude modulation (QAM) in which information is modulated onto both phase and amplitude of a transmitted signal.

To receive the data, the signals may be detected and demodulated. In phase modulated optical communication systems, for example, coherent optical receivers may use coherent detection to detect modulated optical signals and may provide sensitivity advantages over receivers using non-coherent detection. Digital signal processing (DSP) may be implemented in such systems for processing the received signals to provide a demodulated data. Digital signal processing of the received signal provides speed and flexibility and may be used to perform a variety of functions including estimation of the carrier phase of the received signals and data detection using the estimated carrier phase.

Distortion of a signal (e.g., during transmission), however, may adversely affect the integrity of the data that is obtained after detecting and demodulating the signal. In optical communications systems using phase modulation schemes, non-linear effects, such has self phase modulation (SPM), may cause phase distortion in the modulated signal, which may significantly degrade coherent-detection performance and diminish the receiver-sensitivity advantage that coherent detection has over non-coherent detection. The degradation in BPSK signals is described in greater detail in Yi Cai, et. al., "On Performance of Coherent Phase-Shift-Keying Modulation in 40 Gb/s Long-Haul Optical Fiber Transmission Systems", Optical Fiber Communication and the National Fiber Optic Engineers Conference, 2006, paper JThB 11 (March 2006), which is fully incorporated herein by reference.

The distortion in a modulated signal, such as phase distortion in a modulated optical signal, may often be dependent on the data pattern or bit-pattern. FIGS. 9 and 10 illustrate bit-pattern dependent phase distortions that may occur in an optical communication system based on a single-channel nonlinear propagation simulation. FIG. 9 shows a constellation diagram of a distorted BPSK signal in which the constellation points extend above and below the real axis, indicating the effect of phase distortion. FIG. 10 shows phase distortions corresponding to various bit patterns and illustrates how the phase distortions are dependent on bit pattern.

Methods have been proposed for mitigating the performance penalty induced by data-pattern dependent distortion such as nonlinear phase distortion in optical coherent receivers. One method compensates the nonlinear phase distortion based on estimated phase distortion as a function of received signal intensity, for example, as described in K. Ho and J. Kahn, "Electronic compensation technique to mitigate non-linear phase noise," Journal of Lightwave Technology, 22, 779-783 (2004) and in K. Kikuchi "Electronic Post-compensation for nonlinear Phase Fluctuations in a 1000-km 20-Gb/s Optical Quadrature Phase-shift Keying Transmission System Using the Digital Coherent Receiver," Optics Express, Vol. 16, No. 2, 2007, which are fully incorporated herein by reference. This method may fail, however, when optical signal intensity changes significantly during propagation, which is often the case in optical communication systems employing a practical chromatic dispersion map.

Another method compensates nonlinear distortion by digital backpropagation, for example, as described in X. Li, X. Chen, G. Goldfarb, E. Mateo, I. Kim, F. Yaman and G. Li, "Electronic post-compensation of WDM transmission impairments using coherent detection and digital signal processing," Optics Express, vol. 16, no. 2, pp. 880-888, Jan. 21, 2008, and in E. Ip, A. P. T. Lau, D. J. Barros and J. M. Kahn, "Compensation of chromatic dispersion and nonlinearity using simplified digital backpropagation," Proc. of OSA Topical Meeting on Coherent Optical Technologies and Applications, Boston, Mass., Jul. 13-16, 2008, which are fully incorporated herein by reference. This backpropagation method involves complicated calculations and may not be practical in 10-100 Gb/s optical transmissions.

BRIEF DESCRIPTION OF THE DRAWINGS

These and other features and advantages will be better understood by reading the following detailed description, taken together with the drawings wherein:

FIG. 4 is a flow chart illustrating a method for detecting data in a signal with data pattern dependent signal distortion, consistent with an embodiment of the present disclosure.

FIG. 5 is a flow chart illustrating a method for training a data detection system, consistent with an embodiment of the present disclosure.

DETAILED DESCRIPTION

A detection system and method, consistent with the present disclosure, may be used to detect data transmitted in a signal with data pattern dependent signal distortion. In general, the detection system and method compares samples of a received signal with stored samples of distorted signals associated with known data patterns and selects the known data patterns that correspond most closely with the samples of the received signal. The detection system and method may thus mitigate the effects of data pattern dependent signal distortion.

According to exemplary embodiments, detection systems and methods described herein may be used in an optical communication system to mitigate the effects of bit-pattern dependent phase distortion in phase modulated optical signals. The phase modulated optical signals may be modulated using a phase shift keying modulation scheme such as BPSK, QPSK, DPSK, DQPSK, or some other higher order nPSK scheme, or some variation thereof (e.g., RZ-DPSK). In an optical communication system, bit-pattern dependent signal distortion may be caused by fiber nonlinear effects such as self phase modulation (SPM) or other nonlinearities. The detection systems and methods described herein may also be used in other communication systems in which data pattern dependent signal distortion occurs in a transmitted signal.

Figure 1:
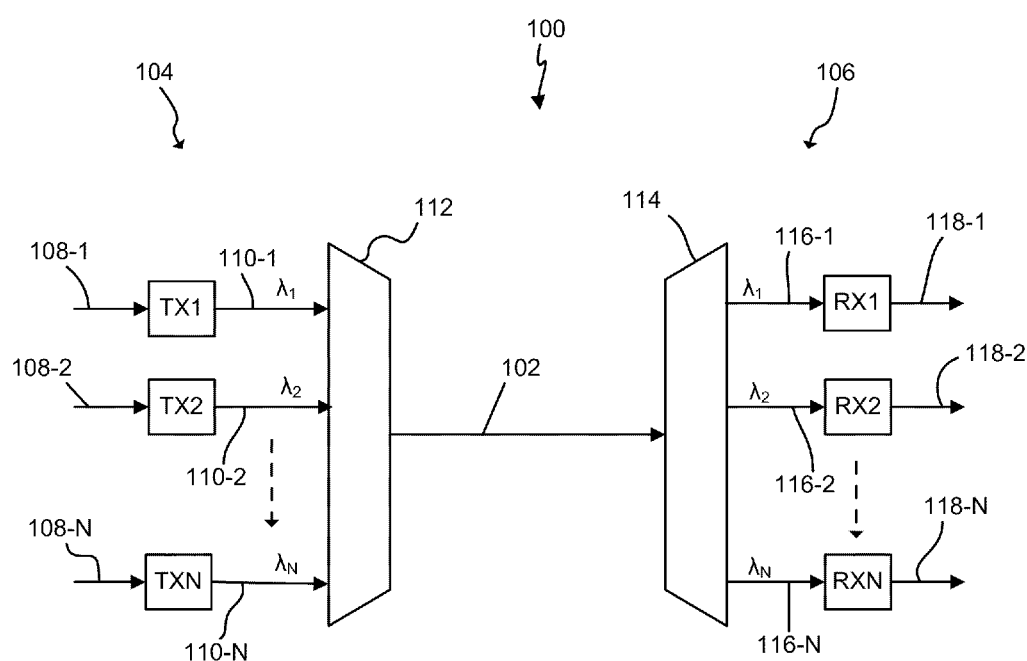
FIG. 1 is a block diagram of one exemplary embodiment of a system consistent with the present disclosure.

FIG. 1 is a simplified block diagram of one exemplary embodiment of a WDM transmission system 100 in which a detection system and method may be used consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a PSK modulation format, such as DBPSK, DQPSK, RZ-DPSK, RZ-DQPSK, etc. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N.

Figure 2:
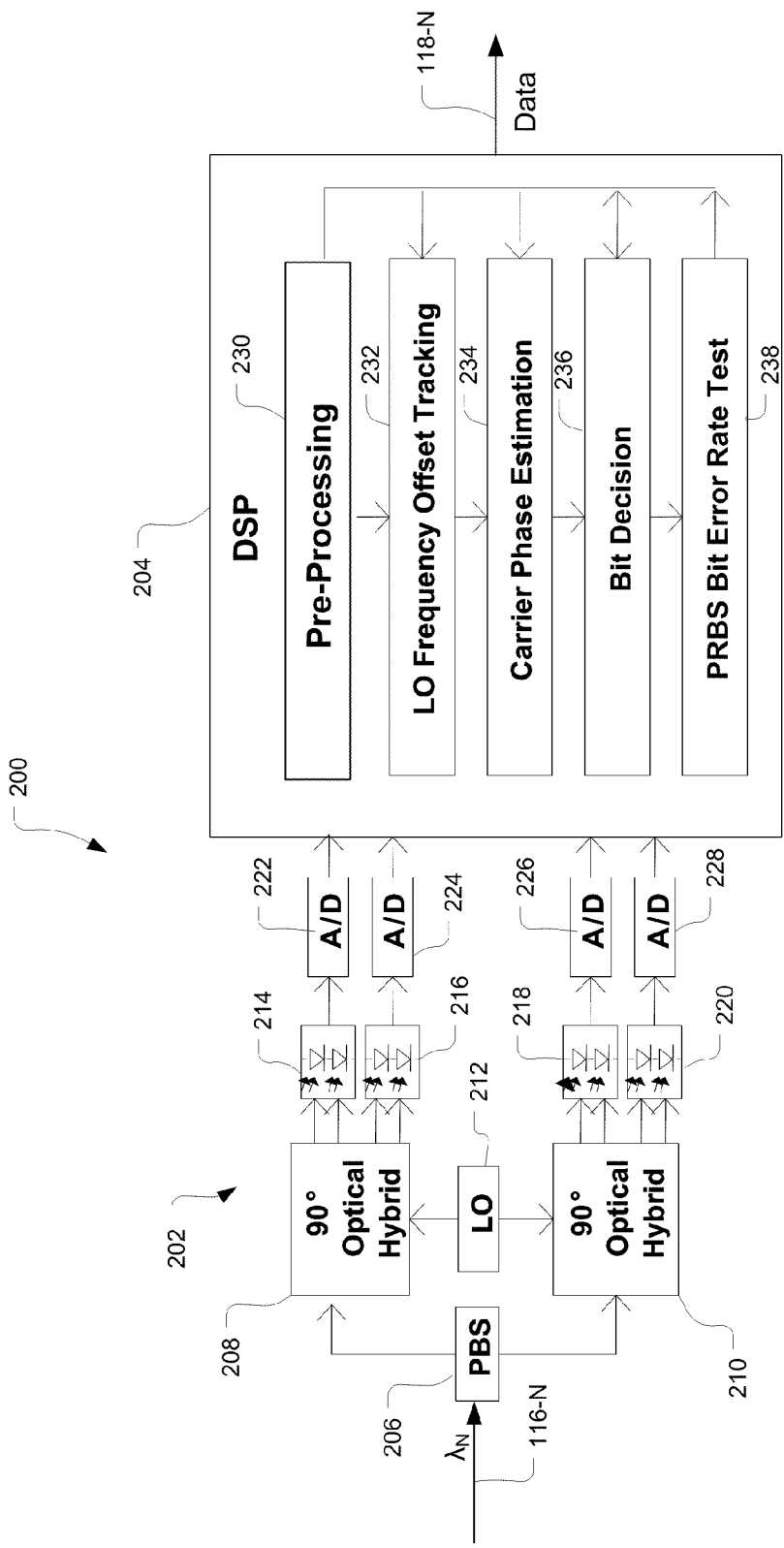
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a coherent receiver configuration 202 for receiving an input signal on path 116-N and a digital signal processing (DSP) circuit 204 for processing the output of the coherent receiver to provide an output data signal on path 118-N. Data is modulated on the carrier wavelength $\lambda_N$ of the optical input signal according to a PSK modulation format. The coherent receiver 202 converts the received optical input signal into one or more digital signals that are provided as inputs to the DSP circuit 204. The DSP circuit demodulates the data from the digital signals to provide an output data stream on path 118-N representative of the data modulated on the carrier wavelength $\lambda_N$.

The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described below. In general, different polarizations of the input optical signal are split onto separate paths by the PBS 206. Each polarization is provided to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228.

The digital outputs of the A/D converters are provided as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 230, an optional local oscillator (LO) frequency offset tracking function 232, a carrier phase estimation function 234, a bit decision function 236 and an optional PRBS bit error rate function 238. These functions may be implemented in a variety of configurations using any combination of hardware, software and/or firmware. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The pre-processing function 230 of the DSP may include various optical signal detection functions implemented in different types of DSP-based coherent detection receivers. The pre-processing functions may include, for example, a waveform recovery and alignment function, a deterministic distortion compensation function, a clock recovery function, a synchronized data re-sampling function, and a polarization tracking and polarization mode dispersion (PMD) compensation function. The optional LO frequency offset tracking function 232 may be configured to track and compensate for frequency offset between the received signal and the LO signal.

In general, since the data in a PSK modulated signal is encoded in the phase of an optical carrier signal, demodulation of a PSK modulated signal in a DSP-based receiver involves estimating and tracking the carrier phase. The carrier phase estimation function 234 is provided for this purpose and may be configured as a dual stage carrier phase estimation function. The carrier phase estimate from the carrier phase estimation function is provided to a bit decision function 236 which determines the data or bit values represented by the carrier phase in the modulated signal and mitigates the effects of data pattern dependent signal distortion such as phase distortion. The data may then be provided on an output on path 118-N representative of the data modulated on the carrier wavelength $\lambda_N$. The optional error rate testing function 238 may be configured for performing a bit error rate (BER) test on training sequence signal for testing performance of the DSP circuit 204.

Figure 3:
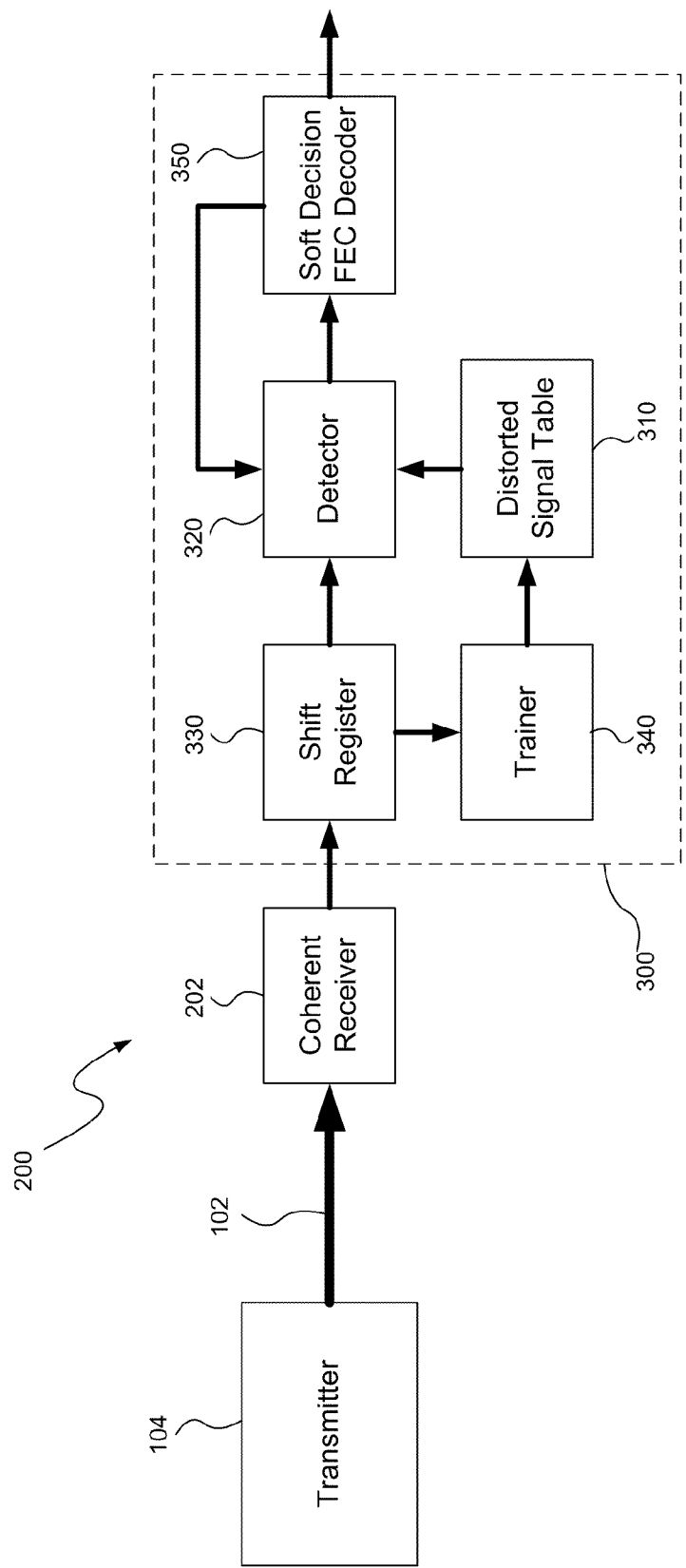
FIG. 3 is a block diagram of a communication system including a receiver with a data detection system for detecting data in a signal with data pattern dependent signal distortion, consistent with an embodiment of the present disclosure.

FIG. 3 shows a simplified communication system incorporating a detection system 300 that may be used to perform the bit decision function 236 (FIG. 2) and that mitigates the effects of data pattern dependent distortion in transmitted signals. The detection system 300 may be implemented in the DSP circuit 204 coupled to the coherent receiver 202 as described above. For simplicity and ease of explanation, the system is shown including only a single coherent receiver for receiving only a single wavelength. It is to be understood that the system may be configured as a WDM system including demultiplexer and a plurality of receivers for receiving multiple wavelengths. In other embodiments, the detection system 300 may be used in other communication systems with other types of receivers.

In the exemplary embodiment, the coherent receiver 202 receives, detects and digitizes a transmitted signal transmitted by a transmitter or transmitting terminal 104. In an optical system transmitting phase modulated optical signals, for example, the coherent receiver 202 receives the optical signal, detects the electrical field of the received optical signal, and produces digitized samples representing the phase of the symbols in the optical signal and thus the data modulated on the optical signal. The detection system 300 may then process samples of the received signal to determine the data values (e.g., the bit values) represented by the samples and provides an output including the data or bit values. In the exemplary embodiment, the detection system 300 processes the samples by comparing the samples to stored samples associated with known data patterns and selecting the known data patterns that correspond most closely to the received samples.

The detection system 300 includes a distorted signal table 310 for storing distorted signal samples associated with known data patterns and a detector 320 for comparing received signal samples with stored signal samples and selecting known data patterns that correspond most closely. The detection system 300 may also include a shift register 330 to obtain received signal samples within a shifting data pattern window having a length corresponding to the length of the known data patterns stored in the distorted signal table 310. The detector 320 may then compare the received samples within the shifting data pattern window to the stored samples in the distorted signal table 310. The distorted signal table 310 may be stored, for example, in a memory within or coupled to the DSP circuit. The detector 320 and shift register 330 may be implemented as hardware, software, firmware, or a combination thereof in the DSP circuit.

In the exemplary embodiment, the data patterns are N-bit patterns including a pattern of a predetermined number (N) of bits (e.g., a 5-bit pattern may include 00000, 00001, 00010, . . . ). As such, the distorted signal table 310 may be an N-bit distorted signal table that stores bit patterns (and associated signal samples) having a length of N bits and the shift register 330 may be an N-bit shift register that provides an N-bit shifting window that obtains received signal samples within the window. An example of 5-bit patterns and associated signal samples from an exemplary optical BPSK modulated signal is provided in Table 1 below.

TABLE 1

| Bit Pattern | Samples | | | | |
| --- | --- | --- | --- | --- | --- |
| 00000 | 0.3 − 0.1i | 0.3 − 0.2i | 0.3 − 0.1i | 0.3 − 0.1i | 0.4 − 0.1i |
| 00001 | 0.3 − 0.0i | 0.3 − 0.0i | 0.4 + 0.0i | 0.4 − 0.0i | −0.4 + 0.1i |
| 00010 | 0.3 − 0.0i | 0.4 − 0.1i | 0.4 − 0.1i | −0.4 + 0.1i | 0.4 − 0.1i |
| . . . | | | . . . | | |
| 11110 | −0.4 − 0.1i | −0.3 − 0.2i | −0.3 − 0.1i | −0.4 − 0.1i | 0.3 + 0.2i |
| 11111 | −0.4 − 0.2i | −0.4 − 0.1i | −0.3 − 0.1i | −0.4 − 0.0i | −0.4 − 0.1i |

When the received signal samples within the shifting data pattern window are fed to the detector 320, the detector 320 selects known data patterns that correspond most closely by using a maximum a posteriori probability (MAP) detection algorithm. For example, the detector 320 may calculate and compare the Euclidean distances between the received samples within the shifting window and the samples in the distorted signal table. The known data pattern in the distorted signal table 310 with the minimum Euclidean distance to the received samples is selected as the MAP decision. The Euclidean distance between received samples within an N-bit window ($rs_1, rs_2, \ldots, rs_N$) and stored samples in an N-bit distorted signal table ($ss_1, ss_2, \ldots, ss_N$) may be calculated as follows:

$$ED=\sqrt{(rs_1-ss_1)^2+(rs_2-ss_2)^2+\ldots+(rs_N-ss_N)^2}$$

Other similar algorithms may also be used to select known data patterns that correspond most closely. According to another embodiment, for example, a maximum correlation criterion may be used to select known data patterns that most closely correspond. A Chase algorithm may also be used to increase the speed of a minimum Euclidean distance or maximum correlation search of the distorted signal table. According to a further embodiment, a maximum likelihood sequence estimation (MLSE) algorithm may be used to select known data patterns that correspond most closely.

The detection system 300 may further include a trainer 340 for training the system with distorted signals representing known bit patterns and for generating the distorted signal table 310. The trainer 340 may be implemented as hardware, software, firmware, or a combination thereof in the DSP circuit. To perform a training function, a preset training sequence, such as a pseudo random bit sequence (PRBS), may be transmitted by the transmitter 104. The coherent receiver 202 receives, detects and digitizes the training sequence signal, which may be distorted as a result of data pattern dependent distortion (e.g., phase distortion in an optical signal).

The shift register 330 obtains the received training sequence signal samples within the shifting data pattern window and feeds the samples to the trainer 340. The trainer 340 arranges the received signal samples into data pattern dependent sets based on the data pattern in the window. For N-bit data patterns, for example, the trainer 340 arranges the received signal samples based on an N-bit pattern in an N-bit window around each bit. In one example, 5-bit data patterns may be arranged such that signal samples associated with 00000 bit patterns are arranged in a set, signal samples associated with 00001 bit patterns are arranged in a set, signal samples associated with 00010 bit patterns are arranged in a set, etc. The trainer 340 may then average the samples in each set to mitigate noise effects and store the averaged samples in memory as the distorted signal table 310 indexed by the bit patterns.

The trainer 340 may perform the training and generate the distorted signal table 310 at the initial stage of system operation. The trainer 340 may also update the distorted signal table during system operations using preset non-user data. Updating the signal table allows the penalty mitigation to adapt to changes, such as polarization mode dispersion (PMD), in the transmission system.

In some embodiments, the detection system 300 may also use soft decision forward error correction (FEC) to improve performance. FEC involves insertion of a suitable error correction code into a transmitted data stream to facilitate detection and correction of data errors about which there is no previously known information. Error correction codes are generated in an FEC encoder (e.g., in the transmitter 104) for the data stream. FEC encoding/decoding may be implemented according to a variety of FEC schemes including, but not limited to, the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC) and the low density parity check (LDPC) code.

In soft decision FEC, multiple bit "soft" information is generated that represents a confidence level or reliability of the received data (e.g., whether a bit is very likely one, likely one, likely zero, or most likely zero). The additional "soft" information enables more efficient FEC decoding. Examples of soft decision FEC are disclosed in greater detail in U.S. Pat. No. 7,398,454, U.S. Patent Application Publication No. 2006/0136798, and U.S. patent application Ser. No. 12/108,155, all of which are fully incorporated herein by reference.

To implement soft decision FEC decoding, the detection system 300 may include a soft decision FEC decoder 350 in combination with the detector 320. The detector 320 may generate a soft-decision data stream, and the soft decision FEC decoder 350 receives the soft-decision data stream, recovers the error correction codes and uses them to correct any errors in the received data stream. In an embodiment, the detector 320 may calculate a reliability of each decision bit to generate the soft-decision data stream. The reliability calculation may be based on the calculated Euclidean distances, maximum correlation criterion, or other criteria representing how closely the received signal samples correspond to the known bit patterns.

The detector 320 may also be responsive to feedback from the FEC decoder 350 to adjust the soft information iteratively, which may further improve the system performance. If the FEC decoder 350 corrects one of the bit values in a received N-bit pattern, for example, the soft information fed back to the detector 320 for that bit pattern reflects the corrected bit. The corrected soft information may then be used by the detector 320 to improve the selection of bit patterns that correspond more closely, for example, by updating the distorted signal table 310.

FIGS. 4 and 5 show methods consistent with the present disclosure. FIG. 4 illustrates a detection method for detecting data in a signal with data pattern dependent signal distortion. This detection method may be implemented using the systems shown in FIGS. 1-3 or in other systems that receive and detect signals having data pattern dependent signal distortion. According to the detection method, distorted signal samples associated with known data patterns are provided 410 (e.g., by training and creating an N-bit distorted signal table). The detection method also includes receiving 412 digitized signal samples (e.g., from a coherent receiver) and obtaining 414 samples within a sliding data pattern window (e.g., provided by an N-bit shift register). The detection method further includes comparing 416 samples within the sliding data pattern window with the samples associated with the known data patterns and selecting 418 the data patterns that correspond most closely with the samples in the data pattern window (e.g., using MAP detection techniques).

FIG. 5 illustrates a training method for training a system for detecting data in a signal with data pattern dependent signal distortion. This training method may be implemented using the systems shown in FIGS. 1-3 or in other systems that receive and detect signals having data pattern dependent signal distortion. The training method includes receiving 510 a signal representing a training sequence (e.g., a PRBS) including data pattern dependent distortion and digitizing 512 the received signal to produce signal samples associated with the training data sequence (e.g., using a coherent receiver). The training method also includes arranging 514 the received signal samples into data pattern dependent sets and storing 516 the received signal samples as a distorted signal table indexed by data patterns.

Figure 6:
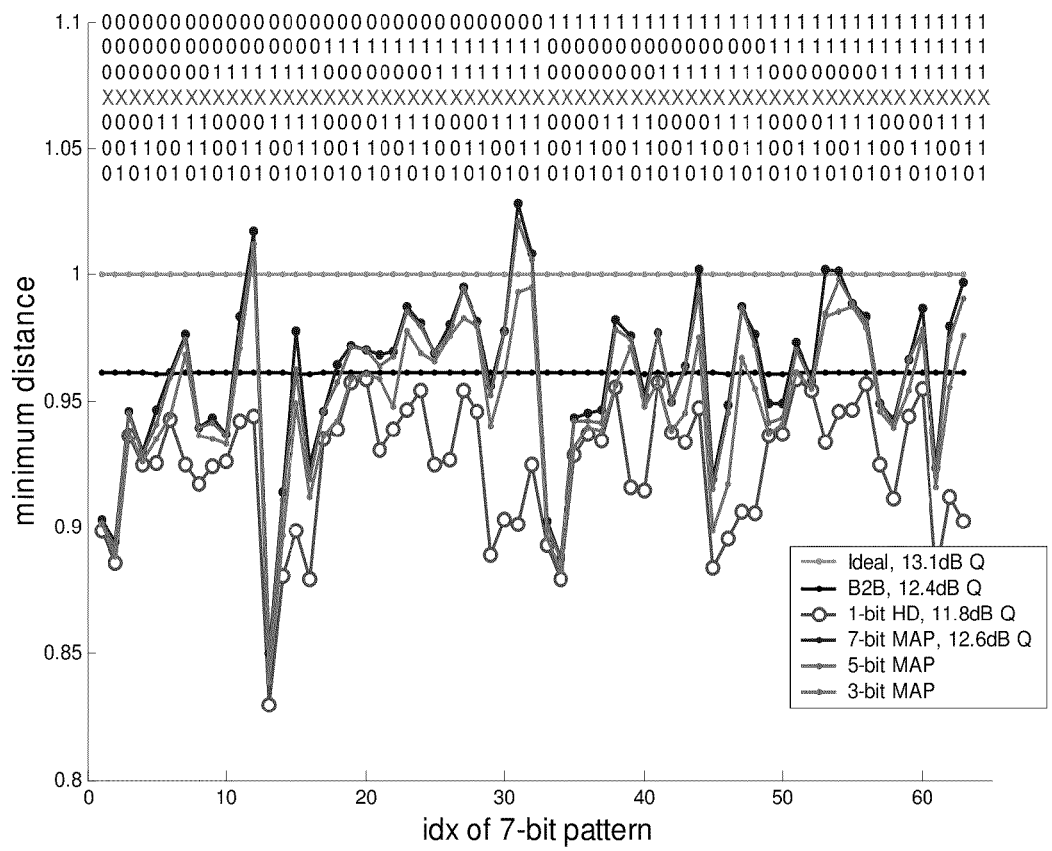
FIG. 6 is a plot illustrating a minimum Euclidean distance for various bit patterns calculated using different maximum a posteriori probability (MAP) detection schemes, consistent with embodiments of the present disclosure.
Figure 7:
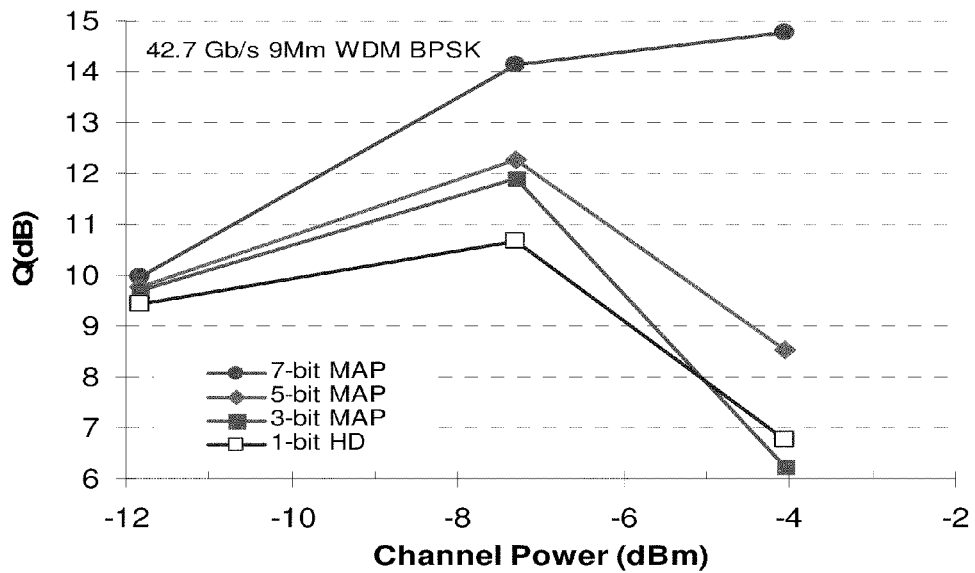
FIG. 7 is a plot illustrating a Q factor as a function of channel power for a simulated optical system using different MAP detection schemes, consistent with embodiments described herein.
Figure 8:
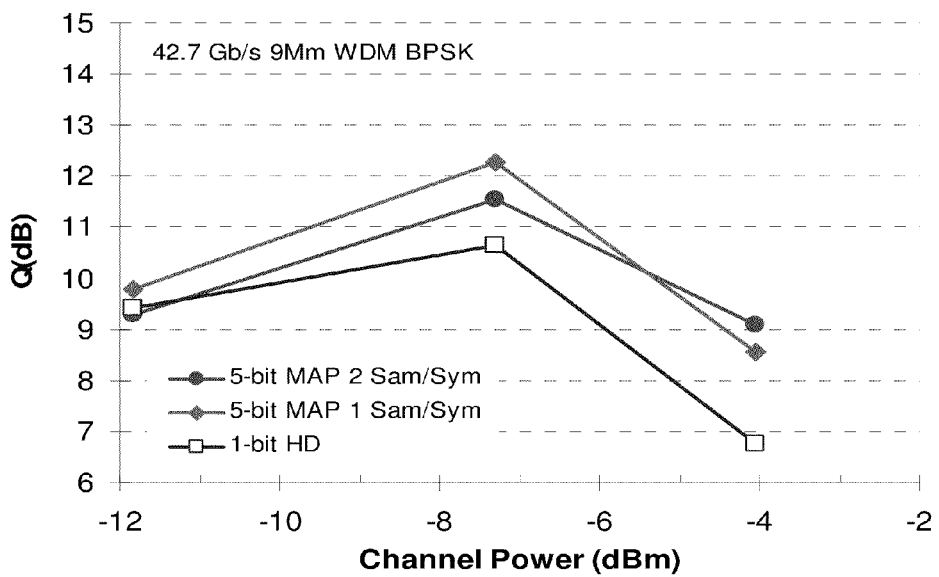
FIG. 8 is a plot illustrating a Q factor as a function of channel power for a simulated optical system using different MAP detection schemes, consistent with embodiments described herein.
Figure 9:
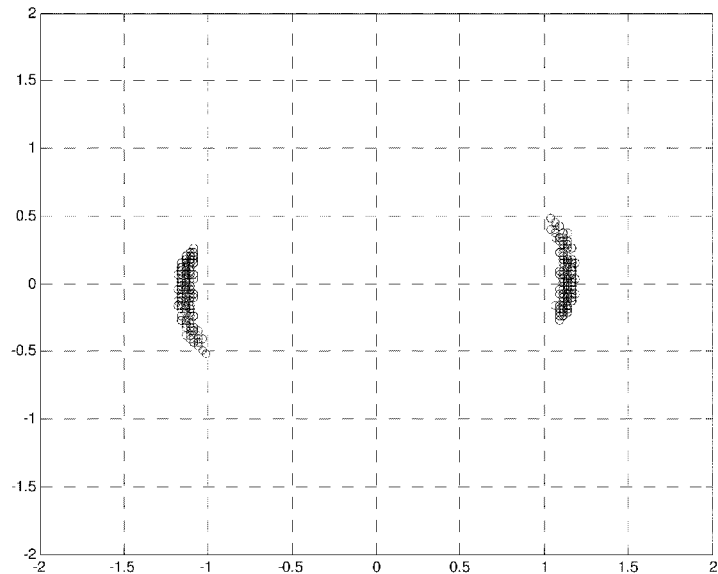
FIG. 9 is a constellation diagram illustrating a distorted BPSK signal.
Figure 10:
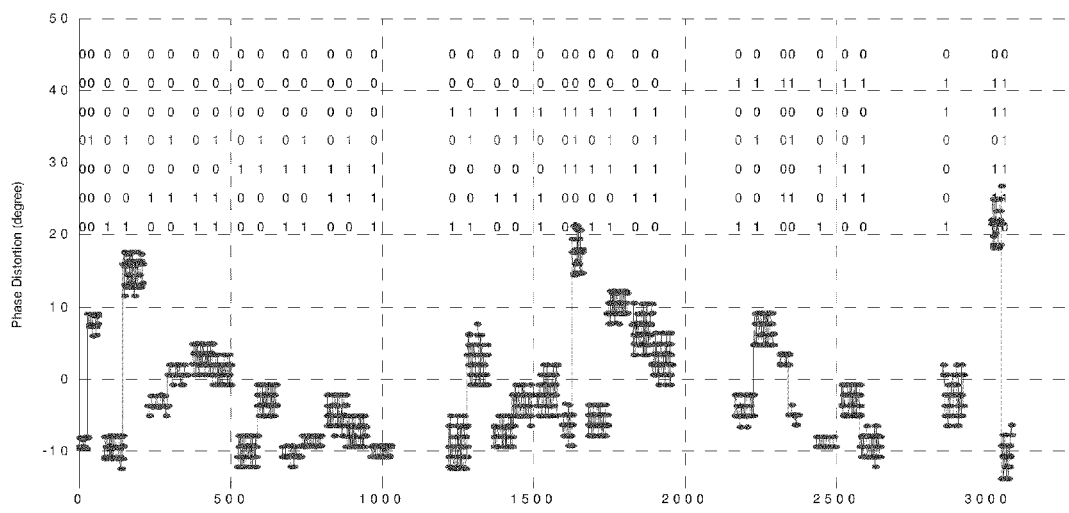
FIG. 10 is a diagram illustrating bit-pattern dependent phase distortions associated with different bit patterns.

FIGS. 6-8 illustrate the effectiveness of the system and method for mitigating data pattern dependent distortion in transmitted signals in a simulated system. The simulated system was based on a 9000 km 40 Gb/s WDM coherent RZ-BPSK system. FIG. 6 illustrates the minimum Euclidean distances of each N-bit pattern to other N-bit patterns using different N-bit windows (e.g., a 1-bit hard decision, a 7-bit MAP, a 4-bit MAP, and a 3-bit MAP) as compared to the ideal and a back-to-back (B2B) noise-loading simulation. As indicated, the 7-bit, 5-bit and 3-bit MAP detection schemes all have minimum Euclidean distances between bit patterns that are closer to the ideal and thus have higher Q factors and larger as compared to the 1-bit hard decision detection.

FIGS. 7 and 8 illustrate the Q factors as a function of channel power. As shown in FIG. 7, the Q factor as a function of channel power is higher for a 7-bit MAP detection as compared to a 5-bit and 3-bit MAP detection and 1-bit hard decision detection. FIG. 7 also shows that the 7-bit MAP detection may significantly improve performance when there are higher nonlinearities. FIG. 8 further illustrates the Q factors as a function of channel power for a 5-bit MAP detection using 2 samples per symbol as compared to a 5-bit MAP detection using 1 sample per symbol. As indicated in the simulated system, using 2 samples per symbol may only help when the system is highly nonlinear and may degrade MAP detection performance in linear and quasi-linear regimes.

Accordingly, embodiments of the detection system and method described herein may mitigate the data pattern dependent signal distortion and improve performance of a communication system such as an optical communication system.

Consistent with one embodiment, a system is provided for detecting data in a signal with data pattern dependent signal distortion. The system includes a distorted signal table configured to store a plurality of known data patterns and samples of distorted signals associated with the known data patterns. The system also includes a data shift register configured to obtain samples of a received signal within a shifting data pattern window having a length corresponding to a length of the known data patterns. The system further includes a detector configured to compare the samples in the data pattern window with the samples in the distorted signal table and to select the known data patterns in the distorted signal table that correspond most closely with the samples in the data pattern window.

Consistent with another embodiment, digital signal processor (DSP) based receiver includes: a coherent receiver configured to receive, detect and digitize a modulated optical signal to produce received signal samples; and a DSP configured to store a distorted signal table including a plurality of known data patterns and samples of distorted signals associated with the known data patterns, to obtain samples of a received signal within a shifting data pattern window having a length corresponding to a length of the known data patterns, to compare the samples in the data pattern window with the samples in the distorted signal table, and to select the known data patterns in the distorted signal table that correspond most closely with the samples in the data pattern window.

Consistent with a further embodiment, a detection method is provided for detecting data in a signal with data pattern dependent signal distortion. The detection method includes: providing a distorted signal table including a plurality of known data patterns and samples of distorted signals associated with the known data patterns; receiving a digitized signal including a plurality of digitized samples; and processing the digitized signal in a digital signal processor to obtain samples in the received signal within a sliding data pattern window having a length corresponding to a length of the known data patterns, to compare the samples in the data pattern window with the samples associated with the known signal patterns, and to select the data patterns in the distorted signal table that correspond most closely with the samples in the data pattern window.

Consistent with yet another embodiment, a training method is provided for training a system for detecting data in a signal with data pattern dependent signal distortion. The training method includes: receiving in a receiver a signal representing a training data sequence; digitizing the received signal to produce signal samples associated with the training data sequence; and processing the digitized received signal in a digital signal processor to arrange the received signal samples into data pattern dependent sets based on data patterns and to store the received signal samples as a distorted signal table indexed by the data patterns.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for detecting data in a signal with data pattern dependent signal distortion, the system comprising:
    a distorted signal table configured to store a plurality of known data patterns and samples of distorted signals associated with the known data patterns;
    a data shift register configured to obtain samples of a received signal within a shifting data pattern window having a length corresponding to a length of the known data patterns; and
    a detector configured to compare the samples in the data pattern window with the samples in the distorted signal table and to select the known data patterns in the distorted signal table that correspond most closely with the samples in the data pattern window.

2. The system of claim 1 further comprising a trainer configured to generate the samples associated with the known data patterns stored as the distorted signal table.

3. The system of claim 2 wherein the trainer is configured to receive signal samples associated with a training data sequence, to arrange the received signal samples into data pattern dependent sets based on data patterns, and to store the received signal samples as the distorted signal table indexed by the data patterns.

4. The system of claim 1 further comprising a soft decision forward error correction (FEC) decoder configured to receive a soft-decision data stream from the detector and to decode encoded data represented by the soft decision data stream to produce decoded data.

5. The system of claim 4 wherein the soft decision FEC decoder is configured to provide feedback to the detector, and the detector is configured to adjust the soft-decision data stream in response to the feedback.

6. The system of claim 1 wherein the distorted signal table is an N-bit signal table configured to store N-bit data patterns having a predetermined number (N) of bits, and wherein the data pattern window is an N-bit window.

7. The system of claim 1 wherein the detector is configured to provide maximum a posteriori probability (MAP) detection.

8. The system of claim 1 wherein the detector is configured to compare the samples and select the known data patterns by calculating Euclidean distances between the samples in the data pattern window and the samples in the distorted signal table and by selecting the samples in the distorted signal table having the minimum Euclidean distances.

9. The system of claim 1 wherein the received signal is an electrical signal converted from a modulated optical signal on which data is modulated using phase shift keying, and wherein the samples represent a phase of each symbol in the modulated optical signal.

10. The system of claim 1 wherein the transmitted signal transmits data at about 100 Gb/s.

11. A digital signal processor (DSP) based receiver comprising:
a coherent receiver configured to receive, detect and digitize a modulated optical signal to produce received signal samples; and
a DSP configured to store a distorted signal table including a plurality of known data patterns and samples of distorted signals associated with the known data patterns, to obtain samples of a received signal within a shifting data pattern window having a length corresponding to a length of the known data patterns, to compare the samples in the data pattern window with the samples in the distorted signal table, and to select the known data patterns in the distorted signal table that correspond most closely with the samples in the data pattern window.

12. The DSP based receiver of claim 11 wherein the modulated optical signal is modulated using phase shift keying, and wherein each of the samples represent a phase of the modulated optical signal.

13. The DSP based receiver of claim 11 wherein the distorted signal table is an N-bit signal table configured to store N-bit data patterns having a predetermined number (N) of bits, and wherein the data pattern window is an N-bit window.

14. The DSP based receiver of claim 11 wherein the DSP is configured to receive signal samples associated with a training data sequence, to arrange the received signal samples into data pattern dependent sets based on data patterns, and to store the received signal samples as the distorted signal table indexed by the data patterns.

15. The DSP based receiver of claim 11 further comprising a soft decision forward error correction (FEC) decoder configured to receive a soft-decision data stream from the detector and to decode encoded data represented by the soft decision data stream to produce decoded data.

16. A detection method for detecting data in a signal with data pattern dependent signal distortion, the method comprising:
providing a distorted signal table including a plurality of known data patterns and samples of distorted signals associated with the known data patterns;
receiving a digitized signal including a plurality of digitized samples;
processing the digitized signal in a digital signal processor to obtain a segment of samples in the received signal having a length corresponding to a length of the known data patterns, to compare the samples in the segment of the received signal with the samples associated with the known signal patterns, and to select the data patterns in the distorted signal table that correspond most closely with the samples in the segment of the received signal.

17. The detection method of claim 16 wherein the known data patterns are N-bit data patterns having a predetermined number (N) of bits.

18. The detection method of claim 16 wherein comparing the samples includes calculating Euclidean distances between the samples in the segment of the received signal and the samples in the distorted signal table, and wherein selecting the data patterns includes selecting data patterns associated with the samples in the distorted signal table having the minimum Euclidean distances.

19. The detection method of claim 16 further comprising:
updating the known data patterns and samples of distorted signals associated with the known data patterns.

20. A training method for training a system for detecting data in a signal with data pattern dependent signal distortion, the method comprising:
receiving in a receiver a signal representing a training data sequence;
digitizing the received signal to produce signal samples associated with the training data sequence; and
processing the digitized received signal in a digital signal processor to arrange the received signal samples into data pattern dependent sets based on data patterns and to store the received signal samples as a distorted signal table indexed by the data patterns.

21. The training method of claim 20 further comprising averaging the samples in each of the data pattern dependent sets.

* * * * *